United States Patent Office 3,777,011
Patented Dec. 4, 1973

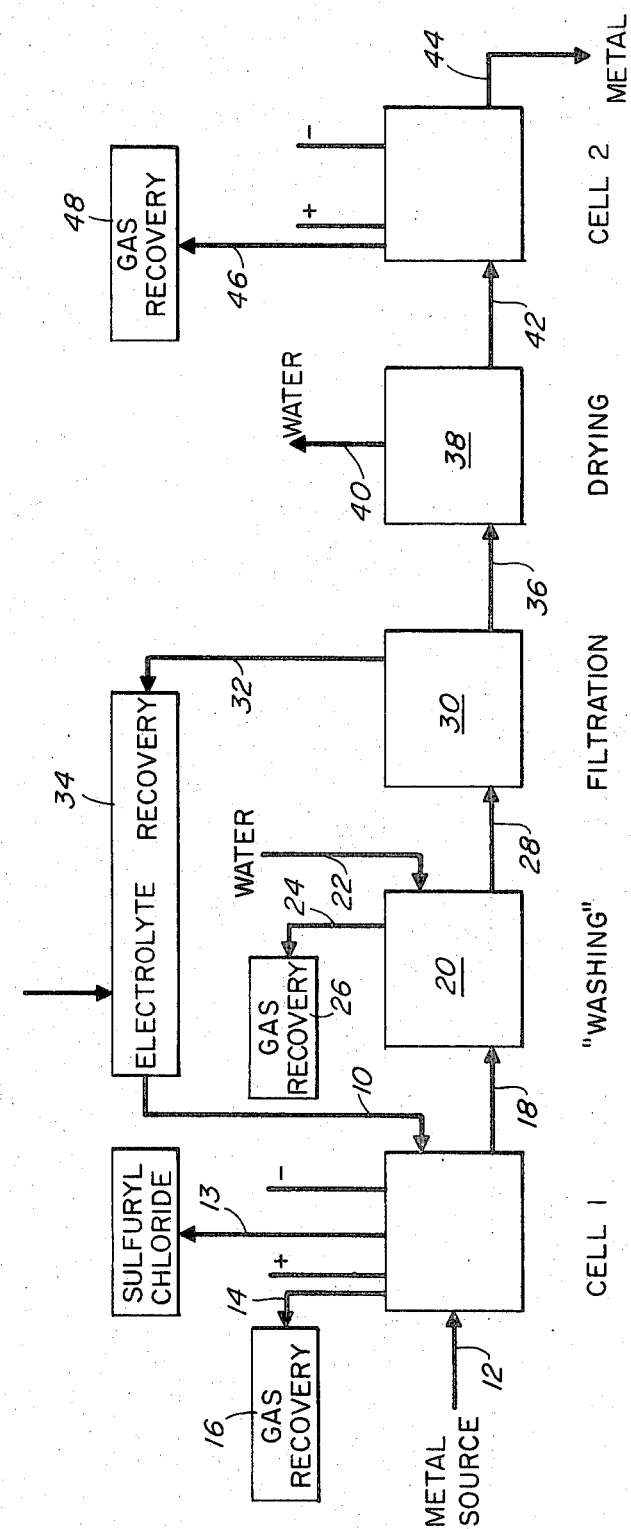

3,777,011
PROCESS FOR EXTRACTING METAL PLATING, SCRAP OR ORE IN A FUSED ELECTROLYTE CELL
Alberto E. Veloso, Quezon City, Philippines, assignor to Internationale Erfinder -und Patentanstalt, Vaduz, Liechtenstein
Filed Oct. 2, 1970, Ser. No. 77,537
Int. Cl. C23b 5/00; C01g 1/02, 1/04
U.S. Cl. 423—592     4 Claims

ABSTRACT OF THE DISCLOSURE

A method of recovering metal from sources such as metal plating, scrap or ore, for example copper from copper ore, including extracting the metal in an electrolytic cell, containing sodium chloride, and forming the purified metal oxide. The metal may then be recovered in purified form electrolytically. The extraction step is performed in a fused electrolyte cell at high temperature, whereby a compound chloride of the metal with sodium is formed, which is then washed with water to form the metal hydroxide. The metal hydroxide is then dried and calcined to form the oxide of the metal, which can be recovered in a second fused electrolyte cell in purified form, containing molten alkali metal or alkaline earth halides and the metal fluoride, or by any suitable conventional method of reducing metal oxides to pure metal.

BACKGROUND OF THE INVENTION

The invention relates to the extraction, recovery and refining of metals, and in particular to a novel electrolytic process for such purposes. The process will be described particularly with respect to the recovery of copper, nickel and iron from their ores, although it is suitable for the recovery of other metals, such as tin, aluminum, zinc, lead, nickel, copper and titanium scraps or plating, by equivalent procedures.

The present process is related to my copending application of the same title, describing particularly a process for extraction of tin, lead, zinc, aluminum and titanium, Ser. No. 77,536, filed Oct. 2, 1970, and a second copending application of mine, entitled Process for Extracting Metal From Metal Plating, Scrap or Ore in an Aqueous Electrolyte Cell, Ser. No. 82,550, filed Oct. 20, 1970.

BRIEF DESCRIPTION OF THE INVENTION

The present process involves a method for extracting metal from scrap metal, plate or ores, and a method of refining the extracted metal in order to obtain the purified metal. In particular, the method is suitable for recovering copper, nickel or iron from scrap or ore.

In the extraction step a fused electrolyte material essentially comprising sodium chloride is used, preferably in combination with sodium hydroxide, with or without other alkali metal halides or hydroxides. In the electrolytic cell, the metal is extracted electrothermically by combining with the sodium chloride to form a double chloride. The resulting metal-sodium chloride is then combined with water to form the metal hydroxide in solution.

The metal hydroxide precipitates from solution and may be recovered and calcined to obtain the purified metal oxide. If desired, the metal oxide may be treated to obtain the purified metal by conventional methods. It is preferred, however, to recover the metal from the oxide electrothermically by a procedure similar to the electrothermic extraction step. In such a step the metal oxide is charged to fused electrolyte cell containing a mixture of fused salts, including the fluoride salt of the metal, and at least one alkali metal halide and one alkaline earth halide, preferably the fluorides. The purified metal is collected at the cathode of the electrolytic cell.

BRIEF DESCRIPTION OF THE DRAWING

The drawing is a block flow diagram showing the preferred extraction and refining steps in combination, both using a fused electrolyte cell.

DETAILED DESCRIPTION OF THE INVENTION

The present method involves extracting metal from a metal source, such as scrap metal, metal plate or ore, in an electrolytic cell using sodium chloride as an electrolyte, and forming a purified metal oxide, which can if desired be converted to the purified metal in a second electrolytic cell. In a preferred embodiment, the metal is extracted in a fused electrolyte cell in the presence of molten sodium chloride by the formation of a double chloride of the metal and sodium, which is converted to sodium chloride and the metal hydroxide by a step of "washing"; and the purified metal is obtained by calcining the metal hydroxide to form the metal oxide and charging the metal oxide to a second fused electrolyte cell, where the purified metal collects at the cathode.

The process can be better understood by reference to the attached figure, a block diagram showing an embodiment of the present method including both fused electrolyte cells. The process will be discussed first in general terms, and the details which vary somewhat depending upon the metal will be discussed below, in specific examples.

An electrolyte to be fused is charged into cell 1 through inlet line 10, and the cell is operated to raise the temperature of the fused electrolyte to the desired operating level. The metal source is then inserted into the electrolyte, as shown by line 12, contained in steel baskets, not shown, connected to rammed, ashless carbon, forming the cell anodes. The molten electrolyte comprises sodium chloride essentially, and may also comprise other alkali metal halides, peroxides or hydroxides. Preferably the electrolyte comprises about 40–75 percent sodium chloride and 25–60 percent sodium hydroxide. As the baskets pass through the cell, any sulfur present in the metal source volatizes as sulfuryl chloride, and exits via line 13. The metal is extracted as a double chloride with sodium, which is formed at the cell cathode. The other gas products, such as chlorine and carbon dioxide, exit cell 1 via line 14, and are recovered in gas recovery unit 16. After the metal is substantially fully extracted from the metal source, the metal-sodium chloride, together with the sodium oxide product of the reaction, is transferred through line 18 to "washing" tank 20.

The "washing" tank 20 contains sufficient water, supplied via line 22, to cool the molten sodium-metal salt and sodium oxide nearly to ambient temperature and to convert it to the metal hydroxide, which precipitates from the solution. The evolving gases from the "washing" tank 20, principally steam exit via line 24 and are collected in gas recovery chamber 26. The metal hydroxide is then transferred via line 28 to filtration unit 30, where the metal hydroxide settles or precipitates to the bottom of tank 30, leaving the sodium chloride and sodium hydroxide in the supernatant fluid, which is removed via line 32 to electrolyte recovery section 34.

The metal hydroxide is removed from chamber 30 via line 36 to drying chamber 38, where the metal hydroxide is calcined to form the oxide, giving off water via line 40.

In cell 2 there is a molten electrolyte comprising the metal fluoride, and alkali metal and alkaline earth halides, preferably the fluorides. Preferably the molten electrolyte comprises 15–25 percent metal fluoride, 45–60 percent alkali metal fluoride, and 15–30 percent alkaline earth fluoride. The metal oxide is charged into cell 2 via line 42, and the purified metal is recovered at the cathode of the cell and obtained through line 44. The gas products of the electrolytic cell, such as carbon dioxide exit via line 46, and are recovered in unit 48.

The above described steps in general apply regardless of either the metal source available, scrap, plate or ore, or the identity of the recovered metal oxide or metal. In each specific instance, however, certain electrolytes, conditions or procedures are preferred, as will be discussed in the examples.

It is desirable, although not essential, to have both cells of similar construction. The cell dimensions may vary from about 4 ft. in depth, 4–10 ft. in width, and 12–48 feet in length. The shell of the cell is suitably 1.5-inch steel lined with firebrick treated with sodium silicate and other insulating materials, the inner portion of which is lined with rammed ashless carbon lining about 10–12 inches thick, which forms the electrolytic cell cathode. The anode of the extraction cell is connected to a suitable steel basket container into which the metal source is charged. In the refining cell the anodes may be individual carbon electrodes about a foot square in dimension, suspended vertically in the center of the cell. Carbon consumption is typically about 0.8 pound for pound of metal refined, for a theoretical efficiency of about 75–90 percent and energy consumption of about 5–10 kw. hrs. per pound of metal.

In the first electrolytic cell, the molten electrolyte comprises preferably 40–75 percent sodium chloride and 25–60 percent sodium hydroxide. The cell is maintained at about 950–1800° C., 8000–18,000 amperes and 12–24 volts. The metal oxide concentration in the refining cell is preferably about 10–25 percent, and the molten electrolyte comprises about 15–25 percent metal fluoride, 45–60 percent alkali metal fluoride and 15–30 percent alkaline earth fluoride. More preferably the electrolyte comprises about 20–25 percent metal fluoride, 15–20 percent potassium fluoride, 30–35 percent sodium fluoride, 15–20 percent calcium fluoride and 5–10 percent barium fluoride. The refining cell is operated at about 1600–2200° C., 24–36 volts and 15,000–40,000 amperes.

The preferred operating conditions for the individual metals extracted are given below:

|  | Copper | Nickel | Iron |
|---|---|---|---|
| Cell 1: |  |  |  |
| Temperature | 950–1,500 | 1,450–1,600 | 1,535–1,800 |
| Amperage | 8,000–15,000 | 8,000–16,000 | 9,000–18,000 |
| Cell 2: |  |  |  |
| Temperature | 1,600–2,000 | 1,600–2,000 | 1,600–2,200 |
| Amperage | 15,000–20,000 | 15,000–20,000 | 20,000–40,000 |

The following examples will describe specific procedures employing the present method for a variety of source metals. It is not intended that these will necessarily describe preferred or ideal embodiments, and by the following specific examples there is no intention to limit the scope of the present invention by any of the specific, nonessential details described.

Example 1.—Copper

Copper ore is mixed with a combination of 60 percent sodium chloride and 40 percent sodium hydroxide and charged into the molten electrolyte of the same composition. The copper sulfide in the ore is converted into sulfuryl chloride in this step, which is allowed to escape through a hooded trap of appropriate construction, fitted with a condensing system to liquify the sulfuryl chloride, and is ultimately stored in carboys or steel drums.

The resulting copper oxide, either monoxide or dioxide, proceeds in the molten electrolyte at 950–1000° C. to form the water soluble copper-sodium chloride anhydride, $CuCl_2 \cdot NaCl$, and sodium oxide, as thus, $$CuO + 3NaCl = CuCl_2 \cdot NaCl + Na_2O$$

The resulting mass is transferred to a "washing" vat, and there it is washed with water. By the mere washing of water, the copper-sodium chloride is converted into cupric hydroxide, $Cu(OH)_2$, a compound of copper insoluble in water. The chemical reaction that takes place is the following:

$$CuCl_2 \cdot NaCl + Na_2O + 2H_2O = Cu(OH)_2 + NaCl + 2NaOH$$

Cupric hydroxide is allowed to settle to the bottom of the vessel, and the supernatant liquid, which is a combination of sodium chloride and sodium hydroxide in aqueous solution, is sent to vacuum evaporators, to be recycled to the electrolytic cell. The residue is washed again with water, and filtered through a rotary vacuum type filter. The cupric hydroxide is calcined to form the purified oxide, a material ready for the second step.

The electrolyte of the second step for copper is about 25 percent copper fluoride, 17 percent potassium fluoride, 33 percent sodium fluoride, 17 percent calcium fluoride, 8 percent barium fluoride. The filler is CuO at a concentration of about 10–20 percent. The cell operates at about 1000–1500° C., 36 volts and 15,000–20,000 amperes. Copper recovery is at least about 90 percent.

Example 2.—Nickel

Nickel ore is mixed with a combination of 60 percent sodium chloride and 40 percent sodium hydroxide and charged into a molten electrolyte of the same composition. Nickel sulfide in the ore is converted into sulfuryl chloride in this step, which is allowed to escape through a hooded trap of appropriate construction, fitted with a condensing system to liquify the sulfuryl chloride, and is stored in carboys or steel drums.

The resulting nickel oxide reacts in the electrolyte to form the highly water soluble nickel-sodium chloride, $NiCl_2 \cdot NaCl$, as thus $$NiO + 3NaCl = NiCl_2 \cdot NaCl + Na_2O$$

The resulting mass is transferred to the "washing" vat, and there it is washed with water. By the mere washing of water, the nickel-sodium chloride is converted into Nickelovs hydroxide, $Ni(OH)_2$, a compound of nickel insoluble in water. The chemical reaction that takes place is the following:

$$NiCl_2 \cdot NaCl + Na_2O + 2H_2O = Ni(OH)_2 + NaCl + 2NaOH$$

The nickel hydroxide is allowed to settle to the bottom of the vessel, and the supernatant liquid, which is a combination of sodium chloride and sodium hydroxide in aqueous solution, is sent to vacuum evaporators to be recycled to the electrolytic cell. The residue is washed again with water, and filtered through a rotary vacuum type filter. The Nickelovs hydroxide is calcined to form the purified oxide, a material ready for the second step.

The electrolyte of the second step for nickel is the same in composition as that used for copper, except that the metal fluoride used is, of course, nickel fluoride, $NiF_2$. The filler is NiO at a concentration of about 10–20 percent. The cell operates at about 1800–2000° C., 36 volts and 15,000–20,000 amperes.

Example 3.—Iron

Iron ore, after having been freed of arsenic, is ground and mixed with a combinatiion of 6 percent sodium chloride and 40 percent sodium hydroxide and charged into a molten electrolyte of the same composition. The iron sulfide in the iron ore is converted into sulfuryl chloride, and is stored in carboys or steel drums.

Then resulting iron oxide reacts in the electrolyte to form the double chloride of iron and sodium, as follows:

$$Fe_2O_3 + 6NaCl + Na_2O + C(anode) 2FeCl_2 \cdot NaCl + 3Na_2O + CO_2$$

The resulting mass is transferred to the "washing" vat, and there it is washed with water. By the mere washing of water, the ferrous chloride-sodium chloride is converted into ferrous hydroxide, $Fe(OH)_2$, a compound insoluble in water. The chemical reaction that takes place is the following:

$$FeCl_2NaCl + Na_2O + H_2O \rightarrow Fe(OH)_2 + 2NaCl + 3NaOH$$

The ferrous hydroxide is allowed to settle to the bottom of the vessel, and the supernatant liquid, which is a combination of sodium chloride and sodium hydroxide in aqueous solution, is sent to vacuum evaporators, to be recycled to the first cell. The residue is washed again with water and filtered through a rotary vacuum type filter. The ferrous hydroxide is calcined to form the purified oxide, a material ready for the second step.

The ferrous oxide is charged into a molten electrolyte of the same composition as used in Examples 1 and 2, except that ferrous fluoride is the metal fluoride used. The cell operates at about 1800–2000° C., 36 volts and 20,000–40,000 amperes.

I claim:

1. A method of forming a metal oxide from a metal source, such as metal plating, scrap or ore, which comprises charging the metal source selected from the group consisting of sources of copper, nickel, and iron into a fused electrolytic cell containing a molten electrolyte comprising about 40–75 percent sodium chloride and 25–60 percent sodium hydroxide, operating said electrolytic cell at about 12–24 volts and about 8000–18,000 amperes, extracting the metal from said metal source acting as anode in said cell in the form of double chloride of the metal and sodium, removing said double chloride from the cell to a second chamber containing water and reacting said double chloride with said water to form the metal hydroxide and a sodium salt, whereby said metal hydroxide settles to the bottom of the chamber as a precipitate, and removing said metal hydroxide from said chamber and calcining said hydroxide to form a substantially pure metal oxide, said extraction step being performed in said molten electrolyte at a temperature of about 950°–1800° C.

2. The method of claim 1 wherein said metal is copper, said extraction step is performed at a temperature about 950–1500° C., and said electrolytic cell is operated at about 8,000–1600 amperes.

3. The method of claim 1, wherein said metal is nickel, said extraction step is performed at a temperature of about 1450–1600° C. and said electrolytic cell is operated at about 8,000–16,000 amperes.

4. The method of claim 1, wherein said metal is iron, said extraction step is performed at a temperature of of about 535–1800° C., and said electrolyte is operated at about 9000–18,000 amperes.

References Cited

UNITED STATES PATENTS

| | | | |
|---|---|---|---|
| 400,667 | 4/1889 | Hall | 204—67 |
| 1,490,372 | 4/1924 | Fireman | 204—96 |
| 2,302,604 | 11/1942 | Dolbear | 204—71 |
| 2,451,491 | 10/1948 | Johnson | 204—67 |
| 2,752,303 | 6/1956 | Cooper | 204—64 R |
| 3,471,258 | 10/1969 | Brixner | 23—200 |
| 3,502,553 | 3/1970 | Gruber | 204—67 |

FREDERICK C. EDMUNDSON, Primary Examiner

U.S. Cl. X.R.

204—64R, 61; 423—604, 632